(12) United States Patent
Sumitani et al.

(10) Patent No.: US 8,776,587 B2
(45) Date of Patent: Jul. 15, 2014

(54) TIRE TESTER

(75) Inventors: Takashi Sumitani, Takasago (JP);
Shogo Sarumaru, Takasago (JP);
Munenori Soejima, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 235 days.

(21) Appl. No.: 13/395,492

(22) PCT Filed: Sep. 22, 2010

(86) PCT No.: PCT/JP2010/005745
§ 371 (c)(1),
(2), (4) Date: Mar. 12, 2012

(87) PCT Pub. No.: WO2011/036876
PCT Pub. Date: Mar. 31, 2011

(65) Prior Publication Data
US 2012/0167674 A1 Jul. 5, 2012

(30) Foreign Application Priority Data
Sep. 25, 2009 (JP) .................... 2009-220849

(51) Int. Cl.
*G01M 17/02* (2006.01)
(52) U.S. Cl.
USPC ........................................... 73/146
(58) Field of Classification Search
None
See application file for complete search history.

(56) References Cited

U.S. PATENT DOCUMENTS

| 4,238,954 | A | | 12/1980 | Langer | |
|---|---|---|---|---|---|
| 6,035,709 | A | * | 3/2000 | Barnette, Jr. | 73/146 |
| 6,338,270 | B1 | * | 1/2002 | Mancosu et al. | 73/146 |
| 6,360,593 | B1 | * | 3/2002 | Schoenfeld | 73/146 |
| 6,644,109 | B2 | * | 11/2003 | Meinen | 73/146 |
| 6,655,202 | B2 | * | 12/2003 | Potts et al. | 73/146 |
| 6,892,612 | B2 | * | 5/2005 | Poling et al. | 82/101 |
| 8,141,415 | B2 | * | 3/2012 | Inoue et al. | 73/146 |
| 2007/0256484 | A1 | | 11/2007 | Imanishi et al. | |

FOREIGN PATENT DOCUMENTS

| JP | 55 124041 | 9/1980 |
|---|---|---|
| JP | 2003 294585 | 10/2003 |
| JP | 2006 138827 | 6/2006 |
| JP | 2007 3416 | 1/2007 |

OTHER PUBLICATIONS

International Search Report Issued Nov. 22, 2010 in PCT/JP10/05745 Filed Sep. 22, 2010.

\* cited by examiner

*Primary Examiner* — Lisa Caputo
*Assistant Examiner* — Jermaine Jenkins
(74) *Attorney, Agent, or Firm* — Oblon, Spivak, McClelland, Maier & Neustadt, L.L.P.

(57) ABSTRACT

Disclosed is a tire tester (1) provided with: a device frame (3); a slide base (10) provided on the device frame (3) so as to be able to move up and down; a large spindle (11) that is attached to the slide base (10) and can rotatably support a large-diameter tire (T1); and a small spindle (12) that is attached to the slide base (10) and can rotatably support a small-diameter tire (T2) that is smaller than the large-diameter tire (T1). The disclosed tire tester (1) can push one of the tires (T1 or T2) against a simulated road surface (5), by means of the up/down movement of the slide base (10), and perform a tire test.

7 Claims, 6 Drawing Sheets

TIRE TESTER

TECHNICAL FIELD

The present invention relates to a tire tester.

BACKGROUND ART

Conventionally, a tire tester provided with a holding means for rotatably holding a tire and a simulated road surface formed on the outer periphery of a drum, endless belt or the like to ground the tire thereon is known. In this tire tester, the tire is rotated by rotating the drum, endless belt or the like by a drive means, whereby various performance tests are performed on the tire in a traveling state. Some tire testers of this type are configured so that the camber angle, slip angle and the like of the tire to the simulated road surface can be adjusted.

As such a tire tester, for example, a tire tester as shown in Patent Literature 1 is known, the tire tester comprising a frame which is moved up and down relative to a device body (hereinafter referred to as "lifting/lowering frame") and a simulated road surface provided below this lifting/lowering frame. In this tire tester, a substantially A-shaped frame is mounted on the lifting/lowering frame so as to be horizontally turnable about a vertical axis drawn through a tread point of the tire. This substantially A-shaped frame can be angled (inclined) so as to be tilted transversely around an axis along a traveling direction of the simulated road surface. The substantially A-shaped frame (hereinafter referred to as "transversely tilted frame") includes a spindle for rotatably supporting the tire.

Namely, in this tire tester, the tire can be grounded (pressed) on the simulated road surface or separated (lifted) from the simulated road surface by lifting and lowering the lifting/lowering frame relative to the simulated road surface which is moving in the horizontal direction. If the angle of the transversely tilted frame is changed on this occasion, the camber angle of the tire to the simulated road surface can be changed since the spindle (the rotational axis of the tire) is inclined thereby so as to cause a difference in height between both ends of its shaft center. Further, if the lifting/lowering frame is turned relative to the transversely tilted frame, the slip angle of the tire to the simulated road surface can be changed since the spindle is also turned (rotated as it is in the horizontal state).

In this tire tester, the spindle has a built-in sensor such as a load cell. Such a sensor can measure reactions or moments of the tire traveling at various camber angles or slip angles.

CITATION LIST

Patent Literature

[PATENT LITERATURE 1] Japanese Patent Application Laid-Open No. 55-124041

The tire tester of Patent Literature 1 is very expensive since it is provided with a high-accuracy spindle which rotatably supports the tire and has a built-in measuring sensor for measuring tire reactions, moments or the like.

However, generally distributed tires have various sizes or uses such as large-diameter tires for truck or bus and small-diameter tires for passenger vehicle, and test conditions such as a test force or load are variously changed according to the sizes or uses. Therefore, a plurality of types of expensive tire testers had to be prepared according to the sizes or uses of tires in the past.

It apparently seems possible that a small-diameter tire can be tested by preparing a tire tester capable of testing large-diameter tires, and mounting the small-diameter tire on this tire tester. However, a major-load sensor to be used in tire test for large-diameter size has a resolution optimized to large tire reactions generated from large-diameter tires. When such a sensor is used to measure a small tire reaction generated from the small-diameter tire, a resolution necessary for measurement of such a small load cannot be maintained in some cases, resulting in deteriorated measurement accuracy.

Namely, since it is substantially difficult, from the viewpoint of the resolution of the sensor, to use a tire tester for large-diameter tire to perform tire test on small-diameter tires, a plurality of tire testers had to be prepared individually according to the sizes or uses of tires in spite of the expensiveness.

SUMMARY OF INVENTION

In consideration of the above-mentioned situation, the present invention has an object to provide a tire tester capable of performing accurate tire test on a plurality of types of tires differed in size or use by one tire tester.

The tire tester according to the present invention comprises: a simulated road surface; a device frame; a slide base provided on the device frame; a large spindle which is attached to the slide base to rotatably support a tire, and has a built-in sensor for measuring tire characteristics of the supported tire; and a small spindle which is attached to the slide base to rotatably support a tire smaller in diameter than tires attachable to the large spindle, and has a built-in sensor for measuring tire characteristics of the supported tire, the slide base being arranged in a vertically movable manner relative to the device frame so that either one of the tire supported by the large spindle and the tire supported by the small spindle can be pressed onto the simulated road surface.

DESCRIPTION OF EMBODIMENTS

Figure 1:
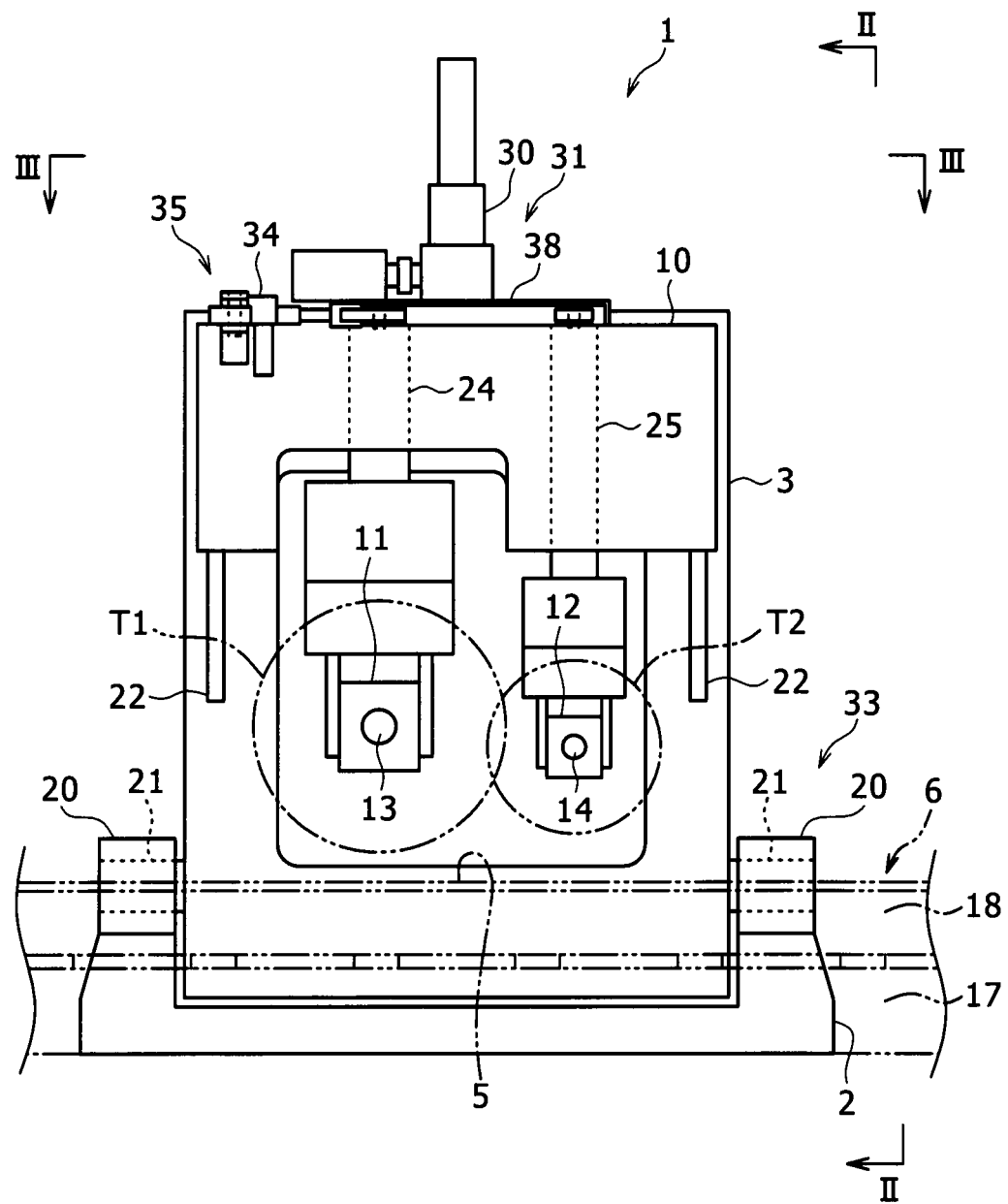
FIG. 1 is a front view showing a tire tester according to a first embodiment of the present invention.

Preferred embodiments of the present invention will be described in reference to the drawings.

First Embodiment

FIGS. 1 to 6 indicate a tire tester 1 according to the first embodiment of the present invention. The tire tester 1 of the first embodiment comprises: a simulated road surface 5; a device frame 3; a slide base 10 provided on the device frame 3; and a large spindle 11 and a small spindle 12 which are attached to the slide base 10 respectively. This tire tester 1 is constituted as a static characteristic tester for measuring a friction resistance or the like which is imposed to a tire rotating on the simulated road surface 5 of a road device 6 when it treads a sensor provided on the simulated road surface 5.

In the following description, the tire tester will be illustrated while taking the lateral sides and vertical sides of FIG. 1 as the lateral direction and vertical direction of the tire tester 1 respectively. Further, the tire tester 1 will be illustrated while taking the left side of FIG. 2 as the near side (front side) of the tire tester 1 and the right side of FIG. 2 as the rear side thereof.

As shown in FIG. 1, the device frame 3 is formed as a gate-shaped member, and a center portion of the device frame 3 is opened to pass through in the longitudinal direction. A lower portion of the device frame 3 is rotatably supported on a base 2 laid on a floor surface, and the device frame 3 can be angled relative to the vertical direction (can be inclined relative to the vertical direction) by being tilted in the longitudinal direction. The base 2 includes a lateral pair of bearing portions 20 protruded so as to hold the device frame 3 from both the lateral sides thereof. A support shaft 21 with a shaft center pointed in the lateral direction is inserted to each of the bearing portions 20. The device frame 3 can be angled by tilting an upper portion of the frame around the laterally pointed support shafts 21 in the longitudinal direction.

On the front surface of the device frame 3 including a lateral pair of guide rails 22 provided at both lateral sides thereof along the vertical direction, the slide base 10 is disposed so as to be movable in the vertical direction along the guide rails 22.

The slide base 10 is formed in a plate shape, and guide members 23 to be engaged with the guide rails 22 respectively are provided on the rear surface thereof. The slide base 10 is vertically movable along the guide rails 22 by a slide base lifting/lowering mechanism 31 which will be described later through a linear motion guide mechanism composed of the guide members 23 and the guide rails 22.

The slide base 10 includes two pivot shafts 24, 25 provided leaving a predetermined clearance between the both in the lateral direction. Each of the pivot shafts 24, 25 is provided so as to vertically extend through the slide base 10. The pivot shafts 24, 25 are rotatable, relative to the slide base 10, about shaft centers pointed in the vertical direction respectively. The large spindle 11 is connected to the lower end of the first pivot shaft 24, and the small spindle 12 is connected to the lower end of the second pivot shaft 25.

The large spindle 11 can rotatably support a large-diameter tire T1. The small spindle 12 can rotatably support a tire T2 relatively small in diameter, compared with the large-diameter tire T1 to be supported by the large spindle 11.

A spindle shaft 13 with a shaft center pointed in the longitudinal direction is rotatably supported on the large spindle 11. The large spindle 11 has a built-in sensor capable of measuring orthogonal triaxial forces applied to the spindle shaft 13 or moments around these axes, such as a multi-force component meter. A tire reaction, moment or the like applied to the tire T1 held on the spindle shaft 13 can be obtained from the output of this sensor.

Similarly, a spindle shaft 14 with a shaft center pointed in the longitudinal direction is rotatably supported on the small spindle 12. The small spindle 12 also has a built-in sensor similar to that of the large spindle 11. A tire reaction, moment or the like applied to the tire T2 held on the spindle shaft 14 can be obtained from the output of this sensor.

The sensor attached to the large spindle 11 has a measurement range or resolution (measurement accuracy) according to a large tire reaction or moment generated in the large-diameter tire T1 supported by the large spindle 11. The sensor attached to the small spindle 12 has a measurement range or resolution (measurement accuracy) according to a small tire reaction or moment generated in the minor-diameter tire T2 supported by the small spindle 12.

The clearance between the large spindle 11 and the small spindle 12 is set to be not less than a distance such that, when a tire with maximum diameter of tires T1 supportable by the large spindle 11 is supported by the large spindle 11, in other words, when a tire T1 having the largest diameter among the tires mountable on the tire tester 1 is attached to the large spindle 11, this tire T1 never contacts (interferes) with the small spindle 12.

Below the tires T1, T2 supported by these large spindle 11 and small spindle 12, the above-mentioned simulated road surface 5 of the road surface device 6 is disposed as an object onto which these tires T1, T2 are to be grounded and pressed.

The large-diameter tire T1 attachable to the large spindle 11 means a tire having a large diameter, compared with the small-diameter tire T2 attachable to the small spindle 12, and does not indicate a certain type or diameter of tires. However, in a configuration such that each of a tire for bus or truck and a tire for passenger vehicle can be tested as this embodiment, the tire for bus or truck, or a tire having a tire diameter of, for example, 800 to 1,200 mm is regarded as the large-diameter tire T1.

The small-diameter tire T2 attachable to the small spindle 12 means a tire having a small diameter, compared with the large-diameter tire T1 attachable to the large spindle 11, similarly to the case of the large-diameter tire T1, and indicates a tire for passenger vehicle or for light truck which has a tire diameter of, for example, 500 to 800 mm in this embodiment.

The above-mentioned base 2 of the tire tester 1 is mounted on the road surface device 6 having the simulated road surface 5. In the first embodiment, the road surface device 6 is provided below the front ends of the large spindle 11 and small spindle 12 and the slide base 10. The road surface device 6 rotates a positionally-fixed tire in contact with the simulated road surface 5 by moving the simulated road surface 5 in the horizontal direction relative to the floor surface.

This road surface device 6 includes an installation frame 17 fixed onto the floor surface, and a moving path body 18 held on the installation frame 17 so as to be movable in the lateral direction. The upper surface of the moving path body 18 is properly paved with a road surface member, whereby the simulated road surface 5 for traveling the tire is formed. The moving path body 18 is horizontally moved in the lateral direction, relative to the installation frame 17, by a drive means such as an actuator (not shown), whereby the simulated road surface 5 can be horizontally moved relative to the floor surface (in other words, to the positionally-fixed tire).

The tire tester 1 of this embodiment includes a slide base lifting/lowering mechanism 31 for lifting/lowering (approaching/separating) the slide base 10 relative to the above-mentioned simulated road surface 5, a camber angle adjustment mechanism 33 for adjusting the camber angle of the tire to the simulated road surface 5, and a slip angle adjustment mechanism 35 for adjusting the slip angle thereof.

Figure 2:
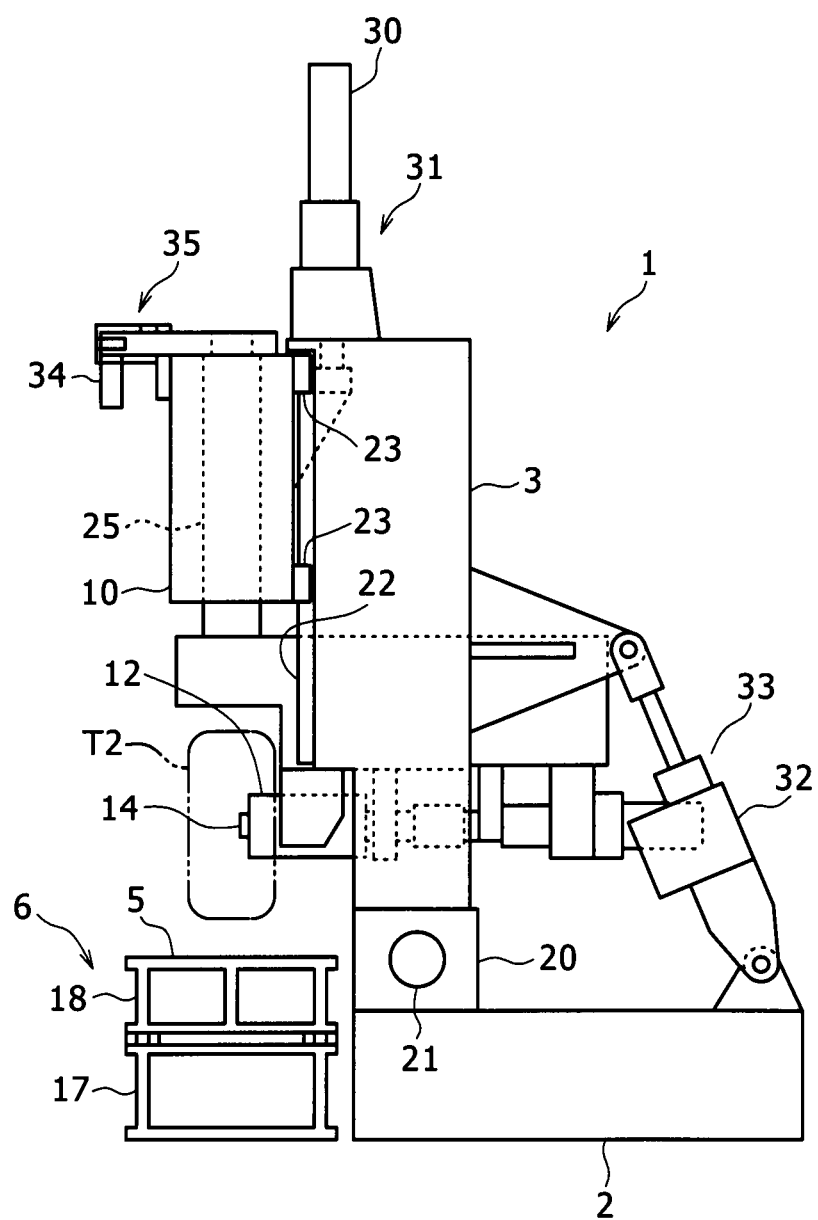
FIG. 2 is a fragmentary view taken in the direction of allows II-II of FIG. 1.
Figure 3:
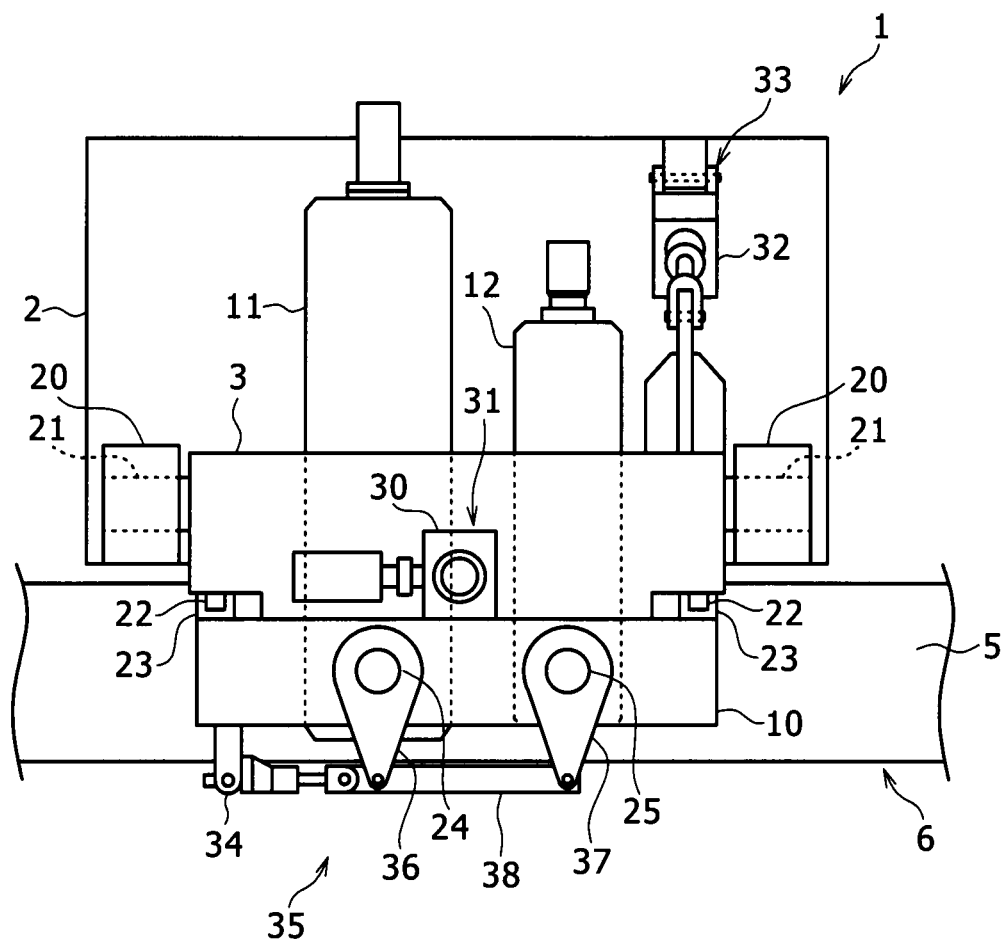
FIG. 3 is a fragmentary view taken in the direction of allows III-III of FIG. 1.

The slide base lifting/lowering 31 is provided on the device frame 3 to lift/lower the slide base 10 relative to the device frame 3. This slide base lifting/lowering mechanism 31 includes a drive mechanism 30 with a sliding shaft pointed in the vertical direction, such as an electric actuator. In FIG. 2, the drive mechanism 30 is provided on the upper side of the device frame 3. The lower end of the sliding shaft of the drive mechanism 30 is connected to the slide base 10 although it is not shown. By extending and contracting this sliding shaft, the tire T1 supported by the large spindle 11 or the tire T2 supported by the small spindle 12 can be grounded on the simulated road surface 5, adjusted in pressing force (grounding load), or separated upward (lifted) from the simulated road surface 5.

Namely, this slide base lifting/lowering mechanism 31, which lifts/lowers the slide base 10 having both the large spindle 11 and the small spindle 12 supported thereon, is a lifting/lowering means common to the tire T1 supported by the large spindle 11 and the tire T2 supported by the small spindle 12.

The camber angle adjustment mechanism 33 for adjusting the camber angle of the tire to the simulated road surface 5 is provided between the base 2 and the device frame 3. This camber angle adjustment mechanism 33 includes a drive mechanism 32, such as an electric actuator, which is provided between a rear-side portion of the base 2 and the rear surface of the device frame 3. The camber angle adjustment mechanism 33 can tilt the device frame 3 in the longitudinal direction by extending and contracting the drive mechanism 32 based on a detection value of a camber angle detection means (not shown) for detecting a rotating angle of the device frame 3 about the axis of the support shaft 21 relative to a reference position to thereby rotate the device frame 3 about the axis of the support shaft 21 relative to the base 2. According to this, the attitude of the device frame 3 is adjusted to a required angle relative to the vertical direction.

Namely, by operating this chamber angle adjustment mechanism 33, the large spindle 11 and small spindle 12 can be inclined so as to produce a difference in height each between both ends of the shaft center of the large spindle 11 and between both ends of the shaft center of the small spindle 12. Therefore, the chamber angle of the tire T1 supported by the large spindle 11 or the tire T2 supported by the small spindle 12 while grounded on the simulated road surface 5 can be variously changed.

Namely, this camber angle adjustment mechanism 33, which adjusts the inclination of the slide base 10 (device frame 3) having both the large spindle 11 and the small spindle 12 supported thereon, is a camber angle change means common to the tire T1 supported by the large spindle 11 and the tire T2 supported by the small spindle 12.

The slip angle adjustment mechanism 35 for adjusting the slip angle of the tire to the simulated road surface 5 is further provided on the slide base 10. This slip angle adjustment mechanism 35 has a drive mechanism 34 for rotating, based on a detection value of a slip angle detection means (not shown) for detecting a rotating angle of the pivot shaft to a reference position, each pivot shaft 24, 25 by a required angle relative to the slide base 10.

Namely, by operating the slip angle adjustment mechanism 35, the tire T1 supported by the large spindle 11 and the tire T2 supported by the small spindle 12 can be rotated about the pivot shafts 24, 25 respectively. Therefore, the slip angle of the tire T1 or tire T2 grounded on the simulated road surface 5 can be variously changed.

In this embodiment, the drive mechanism 34 includes tilting links 36, 37 provided on respective upper end portions of the pivot shafts 24, 25 and a connecting rod 38 mutually connecting the link ends of these tilting links 36, 37, the connecting rod 38 being pushed and pulled by a hydraulic actuator.

The tilting links 36, 37 are provided so that their protruding directions are parallel to each other, and are also aligned so that the turning radius from the shaft center (the axis of rotation) of each pivot shaft 24, 25 to the connecting point with the connecting rod 38 has the same dimension.

Both the tilting links 36, 37 and the connecting rod 38 form a parallel link mechanism. When the connecting rod 38 is pushed and pulled by the hydraulic actuator or the like, both the pivot shafts 24, 25 are simultaneously driven to rotate at the same rotating angle.

Namely, the slip angle adjustment mechanism 35 of this embodiment, which simultaneously rotates both the large spindle 11 and the small spindle 11 at the same rotating angle by the above-mentioned parallel link mechanism, is a slip angle change means common to the tire T1 supported by the large spindle 11 and the tire T2 supported by the small spindle 12.

The small spindle 12 is disposed on the slide base 10 so that its shaft center is lower in level than that of the large spindle 11. The difference in installation height between the shaft center of the large spindle 11 (spindle shaft 13) and the shaft center of the small spindle 12 (spindle shaft 14), which is denoted by a in FIG. 4, is determined as follows.

Figure 4:
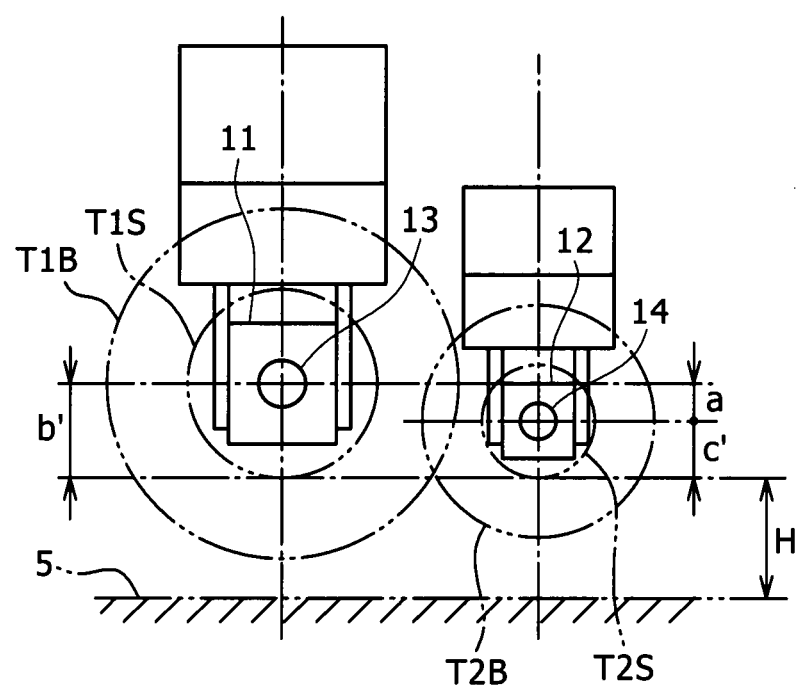
FIG. 4 is a front view illustrating a preferred example for the difference in height between a large spindle and a small spindle.

In FIG. 4, the distance between the outer periphery of a minimum-diameter tire T1S which is separated from the simulated road surface 5 (in an ungrounded state), of tires T1 supportable by the large spindle 11, and the shaft center of the large spindle 11 (spindle shaft 13) is denoted by b'. The distance between the outer periphery of a minimum-diameter tire T2S which is separated from the simulated road surface 5 (in an ungrounded state), of tires T2 supportable by the small spindle 12, and the shaft center of the small spindle 12 (spindle shaft 14) is denoted by c'. The difference in installation height a between both the spindles can be determined so as to satisfy the relationship of a=b'−c'.

In this way, if the difference in level of shaft center between the large and small spindles 11, 12 satisfies the relationship of a=b'−c', the outer peripheral lower ends of the minimum-diameter tires T1S, T2S supported by the large and small spindles 11, 12 are positioned at the same height H from the simulated road surface 5. More precisely, the tires T1, T2, after grounded, are pressed onto the simulated road surface 5 at a predetermined load by further lowering the slide base 10. Therefore, the difference in installation height a between both the spindles is preferably determined, considering a lowering amount of the slide base 10 which is necessary for this pressing.

Namely, when the distance between the outer peripheral lower end of the minimum-diameter tire T1S which is pressed onto the simulated road surface 5 at the predetermined load, of the tires T1 supportable by the large spindle 11, and the shaft center of the large spindle 11 (spindle shaft 13) is denoted by b, and the distance between the outer peripheral lower end of the minimum-diameter tire T2S which is pressed onto the simulated road surface 5 at the predetermined load, of the tires T2 supportable by the small spindle 11, and the shaft center of the small spindle 12 (spindle shaft 14) is denoted by c, the difference in installation height a between both the spindles can be determined so as to satisfy the relationship of a=b−c.

In this way, if the difference in level of shaft center between the large and small spindles 11, 12 satisfies the relationship of a=b−c, the stroke lengths of the slide base 10 required respectively to press the minimum-diameter tires T1S, T2S supported by the large and small spindles 11, 12 onto the simulated road surface 5 at the predetermined load from their ungrounded states are equalized to each other.

It is for the following reason that the difference in installation height a between both the spindles 11, 12 is set to b'−c', more preferably to b−c as described above.

At first, to clarify the meaning that the relationship of $a=b'-c'$ is established, the maximum lowering amount of the slide base 10 required to ground the tire attached to each spindle on the simulated road surface 5 (namely, the stroke length of the slide base 10) will be referred to.

Focusing on the large spindle 11, it is when the minimum-diameter tire T1S of the tires attachable thereto is grounded on the simulated road surface 5 that the stroke of the slide base 10 is maximized. In this case, the stroke length of the slide base 10 corresponds to the lowering amount H of the slide base 10 needed to ground the tire T1S on the simulated road surface 5 as shown in FIG. 4.

The stroke is then considered, focusing on the small spindle 12. In the small spindle 12, also, it is when the minimum-diameter tire T2S of the tires attachable thereto is grounded that the stroke of the slide base 10 is maximized.

When the above-mentioned relationship of $a=b'-c'$ is satisfied, the outer peripheral lower end of the tire T1S is on the same level as the outer peripheral lower end of the tire T2S as described above. Namely, the stroke length in attachment of the tire to the small spindle 11 becomes the same H as the stroke length of the large spindle 11.

Namely, in the case of FIG. 4, if the length of the guide rails 22, for example, is set to a length capable of attaining the above-mentioned stroke length H, both the tire attached to the large spindle 11 and the tire attached to the small spindle 12 can be grounded on the simulated road surface 5.

Figure 5:
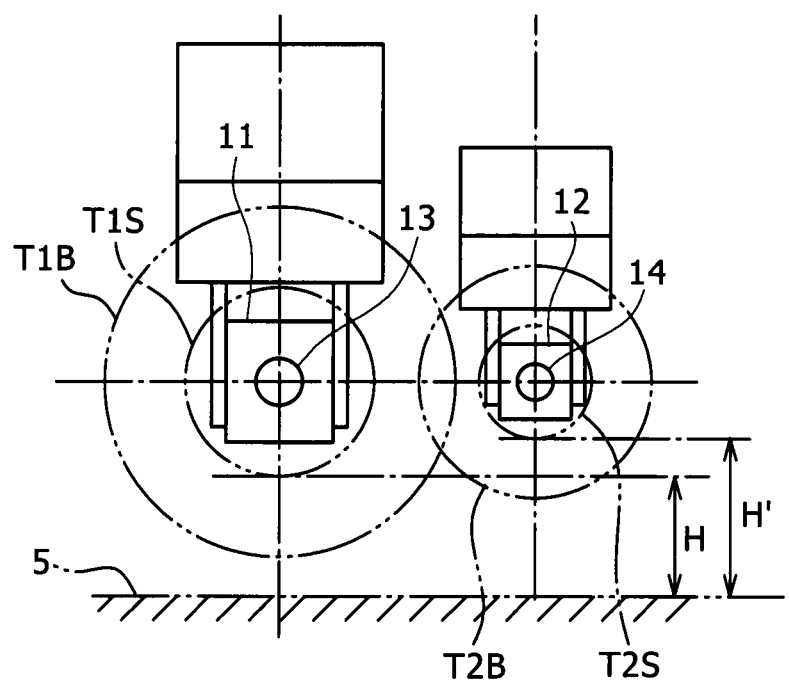
FIG. 5 is a front view illustrating another example for the difference in height between the large spindle and the small spindle.

However, when the large and small spindles 11, 12 are disposed so that their shaft centers are located at the same level as shown in FIG. 5, the stroke length H' in attachment of the tire to the small spindle 12 becomes larger than the stroke length H in attachment of the tire to the large spindle 11, different from the case of FIG. 4. In this case, as shown in FIG. 5, an unnecessary stroke (stroke length corresponding to H'−H) is additionally needed only to lift/lower the tire attached to the small spindle 12, and the length of the guide rails 22, for example, must be set to be longer than in the case of FIG. 4.

Namely, if the large and small spindles 11, 12 are disposed so as to satisfy the relationship of $a=b-c$, the stroke needed to lift/lower the slide base 10 can be minimized since the stroke needed to lift/lower the tire T2 on the small spindle 12 is included in the stroke in attachment of the tire to the large spindle 11.

On the other hand, when the above-mentioned relationship of $a=b-c$ is not satisfied, the above-mentioned unnecessary stroke needed to lift/lower the tire T2 of the small spindle 12 is added to the stroke in attachment of the tire to the large spindle 11. Therefore, the guide rails 22 become larger in length as the shaft center of the small spindle 12 becomes higher in level, and the tire tester consequently tends to be complicated and enlarged. Accordingly, it is preferable to set the shaft center of the small spindle 12 to be lower in level than the shaft center of the large spindle 11, and it is more preferable to set the positions of the respective spindles so as to satisfy the relationship of $a=b-c$.

The levels of shaft center of the large and small spindles 11, 12 can be set also based on the maximum-diameter tires T1B, T2B attachable to the respective spindles 11, 12. However, attention should be paid to that this can bring a positional relationship such that the spindle shaft 14 of the small spindle 12 contacts with the simulated road surface 5 when the slide base 10 is lowered to ground the tire T1 of the large spindle 11.

The above-mentioned relationship of $a=b'-c'$ considers only the stroke of the slide base 10 until the tire is grounded on the simulated road surface 5 at a predetermined load. However, in particular, the installation heights of both the spindles 11, 12 can be more accurately regulated by considering, in addition to the lowering amount H of the slide base 10 needed to ground the tires T1, T2, the lowering amount α of the slide base 10 needed to press the tires T1, T2 after grounding. Accordingly, it is preferred to dispose the large and small spindles 11, 12 so as to satisfy the relationship of $a=b-c$ as described above.

Compared with the lowering amount H of the slide base 10 needed to ground the tires T1, T2, the lowering amount a of the slide base 10 needed to press the tires T1, T2 is vanishingly small. Therefore, in practice, the levels of shaft center of the large and small spindles 11, 12 only have to be set so as to satisfy the relationship of $a=b'-c'$. The same relationship as the above is substantially established even on the basis of the outer periphery of the tire (the outside diameter of the tire) in an unloaded state.

A tire test method using the tire tester 1 according to this embodiment will be then described.

The large spindle 11 or small spindle 12 is selected according to the size of a tire to be tested, a test force or the like, and the tire is properly supported on the selected spindle. When a tire performance test on the large-diameter tire T1, for example, is performed, the tire T1 is attached to the spindle shaft 13 of the large spindle 11, and the slide base 10 is lowered to ground the tire T1 on the simulated road surface 5. On this occasion, the slip angle may be adjusted by operating the slip angle adjustment mechanism 35, or the camber angle may be adjusted by operating the camber angle adjustment mechanism 33. The simulated road surface 5 of the road surface device 6 is then horizontally moved, and a tire reaction, moment or the like generated in the large-diameter tire T1 is measured by the built-in sensor of the large spindle 11. According to this, since the sensor of the large spindle 11 has a measurement range or resolution (measurement accuracy) selected according to a large tire reaction or moment generated in the large-diameter tire T1, even such a large tire reaction or moment can be accurately measured.

On the other hand, when the tire performance test on a small-diameter tire T2 is performed, the small-diameter tire T2 is attached not to the large spindle 11 but to the small spindle 12 in a state where the slide base 10 is lifted. The slide base 10 is lowered similarly to the case of the tire T1, and the simulated road surface 5 of the road surface device 6 is horizontally moved, whereby a tire reaction, moment or the like generated in the tire T2 can be measured by the built-in sensor of the small spindle 12. Since the built-in sensor of the small spindle 12 has a measurement range or resolution (measurement accuracy) selected according to a tire reaction or moment smaller than that in the large spindle 11, even a small tire reaction or moment generated in the small-diameter tire T2 can be accurately measured.

Thus, in the tire tester 1 of the present invention, since the built-in sensors differed in measurement range or resolution of the large and small spindles 11, 12 can be suitably used according to the size or type of a tire to be tested for performance, various sizes of tires can be subjected to tire test with high accuracy and in a wide range of test conditions.

If the large and small spindles 11, 12 are disposed so as to satisfy the relationship of $a=b'-c'$ as described above, both the tires attached to the large and small spindles 11, 12 can be grounded on the simulated road surface 5 with a minimum moving distance. Further, if the large and small spindles 11, 12 are disposed so as to satisfy the relationship of $a=b-c$, both the tires attached to the large and small spindles 11, 12 can be pressed at a predetermined load in addition to being grounded on the simulated road surface 5 with the minimum moving distance, and various sizes of tires can be rapidly and efficiently subjected to tire test.

Second Embodiment

Figure 6:
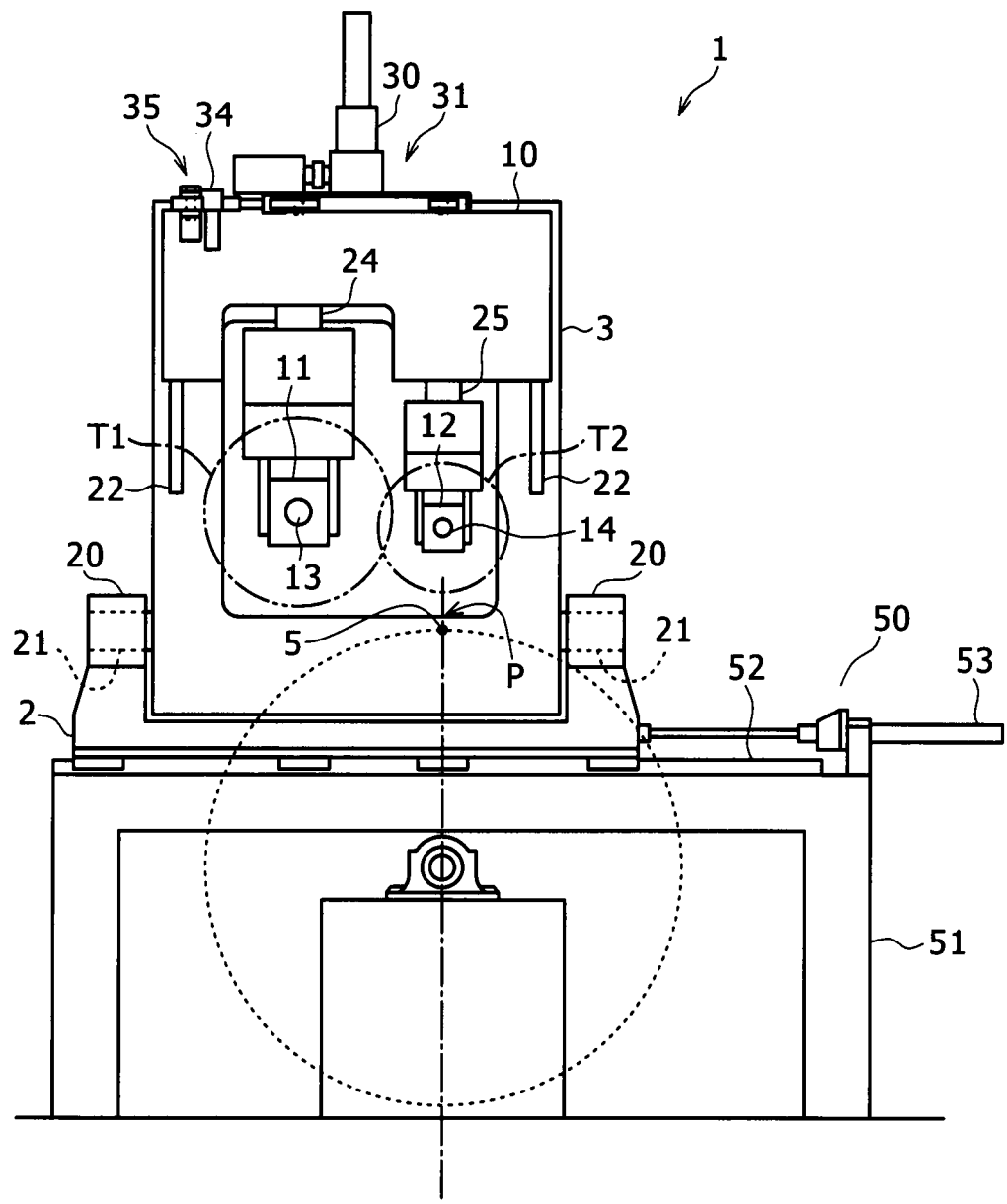
FIG. 6 is a front view showing a tire tester according to a second embodiment of the present invention.

FIG. 6 shows a tire tester 1 according to the second embodiment of the present invention. The tire tester 1 of the second embodiment is differed from that of the first embodiment in the point in which it includes a lateral movement mechanism 50 relative to the slide base 10.

This lateral movement mechanism 50 selectively aligns the shaft center of the large spindle 11 (spindle shaft 13) and the shaft center of the small spindle 12 (spindle shaft 14) with a test position P set on the simulated road surface 5. Since the tire tester 1 of the second embodiment is equipped with such a lateral movement mechanism 50, a road surface device 6 having a drum-shaped simulated road surface 5 can be used.

Namely, since the test point P is set at the vertically top position relative to the rotating center of the drum in such a road surface device 6 having the drum-shaped simulated road surface 5, the slide base 10 must be moved so that the tire T1 or T2 is grounded on the test position P.

In the tire tester 1 of the second embodiment, therefore, the base 2 is horizontally movable in the lateral direction along a guide rail 52 provided on a device frame 51 of the road surface device 6. The base 2 is moved by a drive mechanism 53 provided on the device frame 51 side, such as a hydraulic actuator.

According to this, even when the test position P is limited only to the top position of the drum outer periphery, for example, as in use of the drum-shaped simulated road surface 5, the large spindle 11 and the small spindle 12 can be located respectively above the test position P. Namely, a common simulated road surface 5 can be shared between the large spindle 11 and the small spindle 12, and the tire tester 1 of the present invention can be applied to a configuration using the drum-shaped simulated road surface 5.

Summary of Embodiments

The above-mentioned embodiments can be summarized as follows.

(1) In the above-mentioned embodiments, the tire tester comprises: a simulated road surface; a device frame; a slide base supported on the device frame so as to be vertically movable; a slide base lifting/lowering mechanism for vertically lifting/lowering the slide base; a large spindle which is attached to the slide base so as to be capable of rotatably supporting a tire, and has a built-in sensor for measuring tire characteristics of the supported tire; and a small spindle which is attached to the slide base so as to be capable of rotatably supporting a tire smaller in diameter than tires attachable to the large spindle, and has a built-in sensor for measuring tire characteristics of the supported tire.

The slide base lifting/lowering mechanism lowers the large spindle and the small spindle attached to the slide base by lowering the slide base relative to the device frame to press the tire supported by either one spindle of the large spindle and the small spindle, which is selected according to the diameter of the tire, onto the simulated road surface.

In this configuration, an accurate and reliable measurement result can be obtained by, for example, using the large spindle when testing a large-diameter tire and using the small spindle when testing a small-diameter tire. Therefore, a tire test for large-diameter tire and a tire test for small-diameter tire can be performed by one tire tester, and various sizes of tires can be thus subjected to tire test with high accuracy and in a wide range of test conditions.

(2) In the above-mentioned tire tester, the small spindle is preferably disposed on the slide base so that its shaft center is lower in level than that of the large spindle.

In this configuration, when the small-diameter tire supported by the small spindle is compared with the large-diameter tire supported by the large spindle, the slide base must be moved (lowered) more largely to ground the small-diameter tire of the small spindle onto the simulated road surface. Therefore, if the position of shaft center of the small spindle is set to be lower in level than that of the large spindle as in this configuration, the stroke needed to move the slide base can be reduced.

(3) In the above-mentioned configuration (2), further preferably, the difference in installation height a between the shaft center of the large spindle and the shaft center of the small spindle satisfies the relationship of $a=b-c$, wherein b is the distance between the outer peripheral lower end of a minimum-diameter tire supportable by the large spindle when pressed onto the simulated road surface at a required test force, and the shaft center of the large spindle, and c is the distance between the outer peripheral lower end of a minimum-diameter tire supportable by the small spindle when pressed onto the simulated road surface at the required test force, and the shaft center of the small spindle.

In this configuration, the outer peripheral lower end of the minimum-diameter tire supported by the large spindle and the outer peripheral lower end of the minimum-diameter tire supported by the small spindle have an identical height from the simulated road surface. Thus, the difference between the distance needed to lift/lower the slide base to press the maximum-diameter tire onto the simulated road surface while supporting it by the large spindle (minimum stroke) and the distance needed to lift/lower the slide base to press the minimum-diameter tire onto the simulated road surface while supporting it by the small spindle (maximum stroke) can be minimized, and the stroke needed to move the slide base can be thus minimized.

(4) It is preferred that the above-mentioned tire tester further includes a slip angle adjustment mechanism which is connected to the large spindle and the small spindle and can adjust the direction of the large spindle and the small spindle. In this case, the slip angle adjustment mechanism adjusts the slip angle of the tire supported by either one spindle of the large spindle and the small spindle, which is selected according to the diameter of the tire, by adjusting the direction of the large spindle and the small spindle.

In this configuration, since a common slip angle adjustment mechanism can be shared between the large spindle and the small spindle, the advantage that the device can be simplified by sharing of means is provided.

(5) Concretely, the slip angle adjustment mechanism preferably includes: a first pivot shaft which is rotatably supported on the slide base in an attitude extending in the vertical direction, and to which the large spindle is connected; a second pivot shaft which is rotatably supported at a position with a predetermined distance from the first pivot shaft on the slide base in an attitude extending in the vertical direction, and to which the small spindle is connected; and a drive mechanism for rotating the first pivot shaft and the second pivot shaft to adjust the direction of the large spindle and the small spindle.

(6) It is preferred that the above-mentioned tire tester further includes a camber angle adjustment mechanism which is connected to the device frame and can adjust the inclination of the device frame. In this case, the camber angle adjustment mechanism inclines the large spindle and the small spindle supported on the device frame through the slide base by adjusting the inclination of the device frame to thereby adjust the camber angle of the tire supported by either one spindle of the large spindle and the small spindle, which is selected according to the diameter of the tire.

In this configuration, since a common camber angle adjustment mechanism can be shared between the large spindle and the small spindle, the advantage that the device can be simplified by searing of means can be provided.

(7) It is preferred that the above-mentioned tire tester includes a lateral movement mechanism for moving the large spindle and the small spindle in the horizontal direction relative to the simulated road surface so that either one of the tire supported by the large spindle and the tire supported by the small spindle is alternatively situated at a predetermined test position set on the simulated road surface.

In this configuration, when the test position is limited, for example, as in use of a drum-shaped simulated road surface, only to the top position of the outer periphery of the drum, the large spindle and the small spindle can be situated respectively above the test position. Namely, the tire tester of the present invention can be applied to a configuration using the drum-shaped simulated road surface by sharing the common simulated road surface between the large spindle and the small spindle.

The present invention is never limited to each of the above-mentioned embodiments and can be properly modified according to operation forms.

For example, although the tire tester of the present invention has been illustrated in the above-mentioned embodiments while giving, as an example, a statistic characteristic tester configured to reciprocate a flat road surface, the tire tester of the present invention can be applied also to a dynamic characteristic tester having the above-mentioned drum road surface or a flat belt road surface to be described which is endlessly movable.

Concretely, when the simulated road surface 5 is fixed, the tire tester 1 can adopt a configuration such that the large spindle 11 and the small spindle 12 are horizontally moved, relative to the road surface device 6 having a fixed horizontally long simulated road surface 5, along the simulated road surface 5.

When the simulated road surface 5 is driven, a configuration such that a horizontally long simulated road surface 5 is driven to horizontally move relative to the large spindle 11 and small spindle 12 of the fixed tire tester 1, or a drum around which a metal belt having a surface to be used as the simulated road surface 5 is wound is driven by a flat belt method may be adopted.

Furthermore, in the tire tester 1, the detail structures of the slide base lifting/lowering mechanism 31, the camber angle adjustment mechanism 33, the slip angle adjustment mechanism 35 and the like, the support structures of the large spindle 11 and the small spindle 12, the combination of the base 2 and the device frame 3, and the like can be properly changed according to operation forms. The procedures, kind and the like of the tire test method are also never limited.

REFERENCE SIGNS LIST

1. Tire tester
3. Device frame
5. Simulated road surface
10. Slide base
11. Large spindle
12. Small spindle
24. First pivot shaft
25. Second pivot shaft
31. Slide base lifting/lowering mechanism
33. Camber angle adjustment mechanism
35. Slip angle adjustment mechanism
50. Lateral movement mechanism
T1. Tire
T2. Tire
P. Test position

The invention claimed is:

1. A tire tester comprising:
a simulated road surface;
a device frame;
a slide base supported on said device frame so as to be vertically movable;
a slide base lifting/lowering mechanism for vertically lifting/lowering said slide base;
a large spindle which is attached to said slide base so as to be capable of rotatably supporting a tire, and has a built-in sensor for measuring tire characteristics of the supported tire; and
a small spindle which is attached to said slide base so as to be capable of rotatably supporting a tire smaller in diameter than tires attachable to said large spindle, and has a built-in sensor for measuring tire characteristics of the supported tire,
said slide base lifting/lowering mechanism lowering said large spindle and said small spindle attached to said slide base by lowering said slide base relative to said device frame to press the tire supported by either one spindle of said large spindle and said small spindle, which is selected according to the diameter of the tire, onto said simulated road surface.

2. The tire tester according to claim 1, wherein said small spindle is disposed on said slide base so that its shaft center is lower in level than that of said large spindle.

3. The tire tester according to claim 2, wherein a difference in installation height a between the shaft center of said large spindle and the shaft center of said small spindle satisfies the relationship of a=b−c, wherein b is the distance between the outer peripheral lower end of a minimum-diameter tire supportable by said large spindle when pressed onto said simulated road surface at a required test force, and the shaft center of said large spindle, and c is the distance between the outer peripheral lower end of a minimum-diameter tire supportable by said small spindle when pressed onto said simulated road surface at a required test force, and the shaft center of said small spindle.

4. The tire tester according to claim 1, further comprising a slip angle adjustment mechanism which is connected to said large spindle and said small spindle and can adjust the direction of said large spindle and said small spindle,
said slip angle adjustment mechanism adjusting the slip angle of the tire supported by either one spindle of said large spindle and said small spindle, which is selected according to the diameter of the tire, by adjusting the direction of said large spindle and said small spindle.

5. The tire tester according to claim 4, wherein said slip angle adjustment mechanism includes:
a first pivot shaft which is rotatably supported on said slide base in an attitude extending in the vertical direction, and to which said large spindle is connected;
a second pivot shaft which is rotatably supported at a position with a predetermined distance from said first pivot shaft on said slide base in an attitude extending in the vertical direction, and to which said small spindle is connected; and a drive mechanism for rotating said first pivot shaft and said second pivot shaft to adjust the direction of said large spindle and said small spindle.

6. The tire tester according to claim 1, further comprising:
a camber angle adjustment mechanism which is connected to said device frame and can adjust the inclination of said device frame, said camber angle adjustment mechanism inclining said large spindle and said small spindle supported on said device frame through said slide base by adjusting the inclination of said device frame to thereby adjust the camber angle of the tire supported by either one spindle of said large spindle and said small spindle, which is selected according to the diameter of the tire.

7. The tire tester according to claim 1, further comprising:
a lateral movement mechanism for moving said large spindle and said small spindle in the horizontal direction relative to said simulated road surface so that the tire supported by said large spindle and the tire supported by said small spindle are alternatively situated at a predetermined test position set on said simulated road surface.

\* \* \* \* \*